A. BLEECKER.
APPARATUS FOR MAKING TUBES.
APPLICATION FILED MAR. 3, 1916.
1,196,648.
Patented Aug. 29, 1916.
2 SHEETS—SHEET 1.
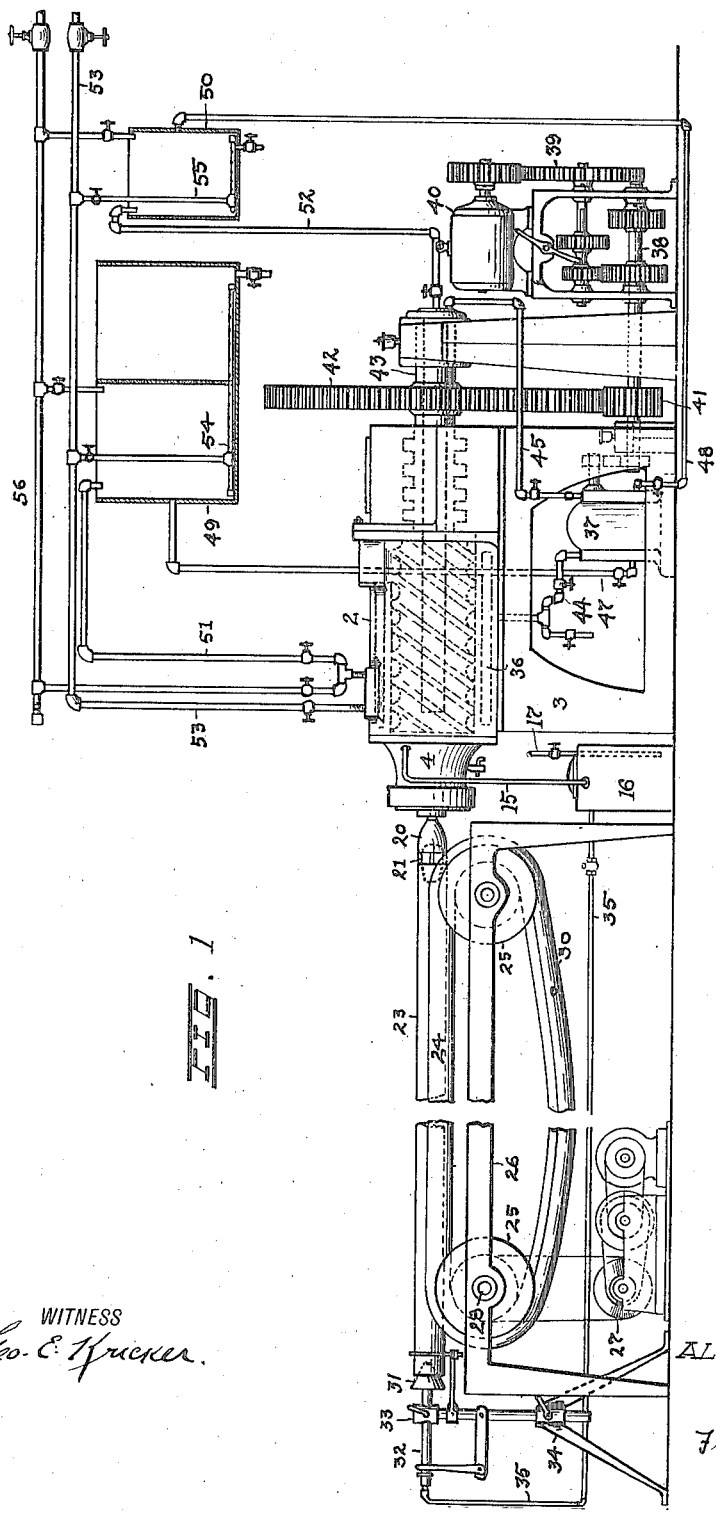
WITNESS
Geo. E. Kricker.
INVENTOR
ALBERT BLEECKER.
BY
Fisher
ATTORNEYS A. BLEECKER.
APPARATUS FOR MAKING TUBES.
APPLICATION FILED MAR. 3, 1916.
1,196,648.
Patented Aug. 29, 1916.
2 SHEETS—SHEET 2.
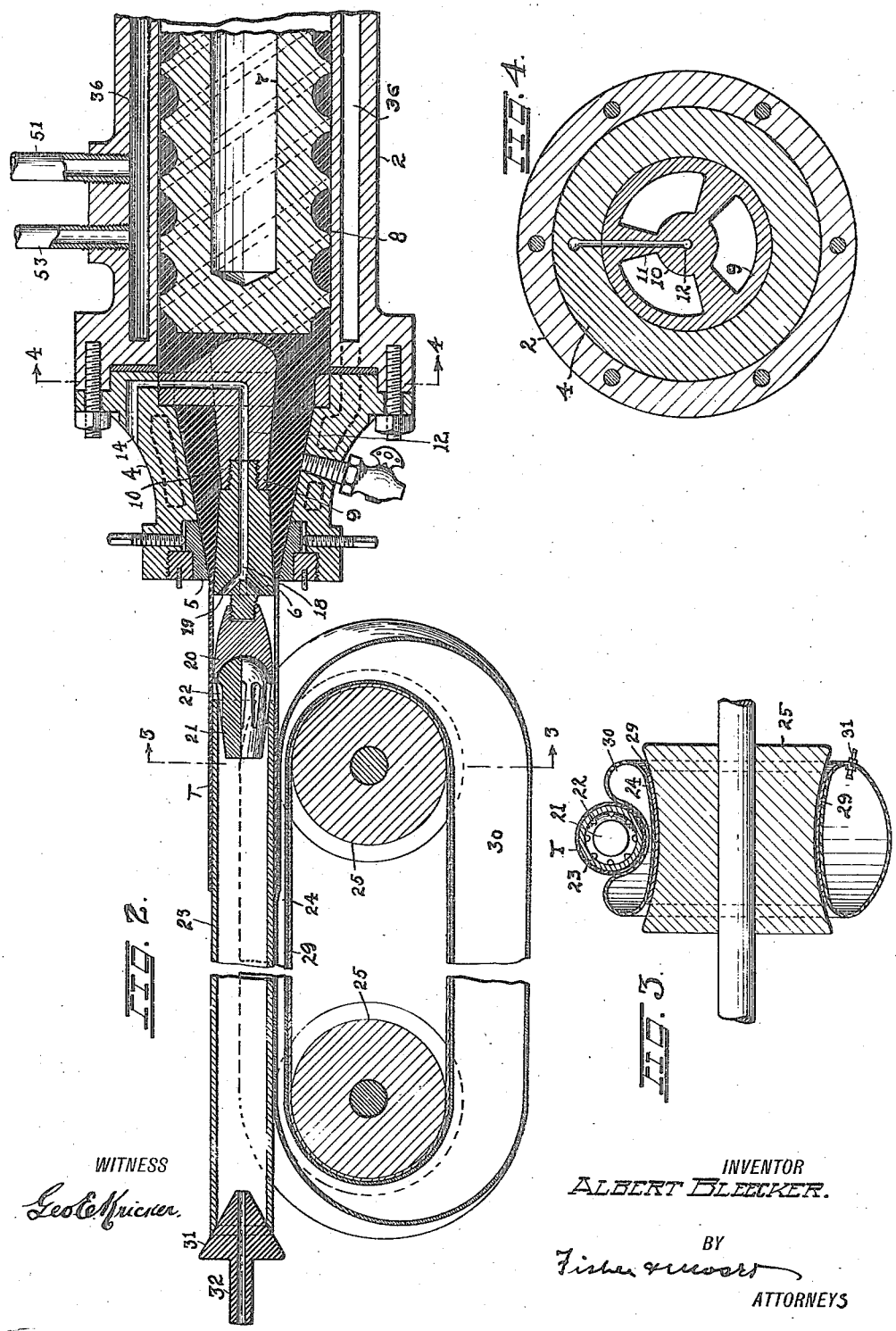
WITNESS
Geo E Kricker
INVENTOR
ALBERT BLEECKER.
BY
Fisher & Moore
ATTORNEYS

UNITED STATES PATENT OFFICE.

ALBERT BLEECKER, OF AKRON, OHIO.

APPARATUS FOR MAKING TUBES.

1,196,648.  Specification of Letters Patent.  Patented Aug. 29, 1916.

Application filed March 3, 1916. Serial No. 81,844.

*To all whom it may concern:*

Be it known that I, ALBERT BLEECKER, a subject of the Czar of Russia, residing at Akron, in the county of Summit and State of Ohio, have invented certain new and useful Improvements in Apparatus for Making Tubes, of which the following is a specification.

This invention pertains to an apparatus for making rubber tubes, particularly inner tubes for tires, and comprises the improved arrangement and construction of parts hereinafter shown and described and more particularly pointed out in the claims.

The invention involves means for feeding rubber stock forward continuously under a uniform pressure while maintaining the stock in a heated plastic condition, using a worm with four spirals and flutes to force the stock into the dies from four equi-distant radial points, and employing a pump to force steam-heated water through the worm and its confining cylinder to maintain the stock in the proper plastic condition.

A further object is to provide means to circulate talc powder or soapstone through the rubber tube and a mandrel supporting said tube, returning the surplus powder to the source of supply for further use.

Another object is to provide an inflatable conveyer and a transportable mandrel opposite thereto, whereby the product of this apparatus may be delivered without injury or distortion to other apparatus used in the process of manufacturing such tubes.

In the accompanying drawings, Figure 1 is a side elevation of my improved apparatus. Fig. 2 is a longitudinal section through the head portion of the machine including the mandrel and tube conveyers, the said mandrel and conveyers having their central portions broken away. Fig. 3 is a cross section of the mandrel and conveyer on line 3—3, Fig. 2. Fig. 4 is a cross section of the head of the machine on line 4—4, Fig. 2.

The apparatus comprises a jacketed cylinder 2 mounted on a pedestal 3, the front end of the cylinder having a removable head 4 with a contracted mouth through which the rubber stock is forced, a die 5 and a core 6 being mounted in spaced relations at the end of this mouth to produce the tube T. The cylinder has a central round bore containing a fluted worm 7 to force the rubber stock through the head 4, and I construct the worm with four spirals and corresponding flutes 8 which terminate at the head at four equi-distant radial places, thereby feeding the stock uniformly and preventing flaws and air bubbles in the finished product. The holder 9 for the central core 6 occupies an annular seat in said head and has a central extension 10 supported by radial arms 11, and a passage 12 is formed through said extension and one of said arms through which the talc powder or soapstone is introduced by way of channel 14 into the head, and a pipe 15 leads to a source of supply comprising a vessel 16 which is under air pressure through a valved pipe 17, see Fig. 1. The core 6 has a longitudinal passage 18 which communicates with passage 12, and the talc powder is discharged through diverging ducts 19 at the front end of passage 18. A cupped and flaring member 20 is detachably screwed upon the front end of the core 6, and the cupped end of member 20 seats a tapered plug or holder 21 having longitudinal grooves 22 radially therein in advance of the front end of member 20. A tubular mandrel comprising a metal pipe 23 is sleeved at one end upon the tapering portion of the plug 21 with the extremity of the pipe extending partly over the channels 22 so that open communication is maintained constantly with the interior of said pipe at a number of equi-distant places radially of the pipe, whereby the surplus powder may find its way into the mandrel or pipe during the forward movement of the rubber tube T after it comes from the dies.

As the development of the tube T progresses, it is fed and carried forward at a given rate of speed by an endless conveyer 24 traveling around a pair of concaved drums or pulleys 25. These pulleys are supported upon a suitable frame 26, and variable speed driving mechanism 27 of any suitable character or kind is connected up with the shaft 28 of the drum at the front end of frame 26. Conveyer 24 is particularly constructed to engage the circular bottom side of tube T without excessive pressure, having in mind also the soft and plastic condition of the tube. Thus, the conveyer comprises an endless base strip 29 of any suitable non-stretchable material and upon this base is an endless rubber tube 30 which is adapted to be inflated to any degree by pumping air through a valved nipple 31, see Fig. 3. The straight stretch of the tubular portion 30 of the belt or conveyer runs parallel with and sufficiently close to the mandrel 23 so that the tube 30 will embrace said mandrel at its sides as well as its bottom and consequently engage the tire tube T in the same manner. In this way an air-cushioned conveyer of cured rubber is provided for the soft tire tube of uncured rubber, whereby said tube may be carried longitudinally of the mandrel without compressing, stretching or distorting the tube in any way, and when a given length of tire tube has been made it is cut off by any suitable cutting device, as by a wire looped about the tube. Then the mandrel 23 and tire tube T may be carried away safely together to the wrapping machine, not shown. To facilitate this purpose I support the outer end of the mandrel or pipe 23 upon a cone 31 having a shaft 32 slidably mounted within a standard 33, which is mounted for vertical adjustment on a suitable support 34. A central opening in cone 31 and its shaft 32 provides an exit for the talc powder and compressed air from mandrel 23, and a hose or pipe 35 may be used to convey the powder back to vessel 16, or to a separate and other suitable place of deposit.

The rubber stock for making the tire tube is kept in the proper plastic and working condition by circulating hot water or steam through the chambered jacket 36 of cylinder 2, and the worm 7 is also provided with a central chamber for holding water suitably heated by exposure to steam. As shown, the means for circulating and heating the water consist of a small double pump 37 which is driven by belt or gearing from a shaft 38 operated by suitable gearing 39 leading back to an electric motor 40. A pinion 41 on shaft 38 also drives the large gear 42 on the worm extension 43. Separate lines of pipe 44 and 45 lead from pump 37 to the water jacket of cylinder 2 and the capped end of worm extension 43, and separate pipes 47 and 48 connect the pump with separate water supply tanks 49 and 50. The water circulates through the cylinder 2 and the worm 7 and passes therefrom through separate lines of pipe 51 and 52 back to said receptacles 49 and 50, respectively. A steam supply pipe 53 connects with cylinder 2 to supply steam directly to the jacketed chamber therein whenever this may be deemed desirable or necessary, and short L branches of pipe 54 and 55 having numerous outlet orifices extend from steam pipe 53 into tanks 49 and 50 to heat the water therein. A line of water supply pipe 56 is also shown leading to each tank and the cylinder 2.

What I claim is—

1. In an apparatus for making tubes, a cylinder head and a core and a die concentric therewith and adapted to form a tube, the said core having a powder circulating passage centrally through the same and the said die supported in the outer portion of said head, in combination with a channeled outwardly tapered mandrel supporting member seated in the front of said core and a tubular mandrel in sleeved engagement over said tapered member.

2. An apparatus for making rubber tubes, a cylinder head and a core holder seated therein and a tapered core fixed in said holder, said core and holder having a passage for powder, a die concentric with said core supported in said head, and means to receive and convey the tube from said core and die.

3. In an apparatus for making tubes, a cylinder head having a tubing core provided with a circulating passage for talc powder, in combination with a tubular mandrel to receive the tube, and means to removably support said mandrel at its opposite ends in open communication axially with the front end of said core.

4. In an apparatus for making tubes, a cylinder head having a tubing core provided with a circulating passage for a talc powder, in combination with a tubular mandrel and a movable end pressure member to hold said mandrel in removable connection with said core.

5. In an apparatus for making tubes, a cylinder head having a tubing core provided with a circulating passage for a talc powder, in combination with a tubular mandrel mounted axially opposite and in open communication with said passaged core, and a movable centering support for the outer end of said mandrel having a discharge passage open to the interior of the mandrel.

6. In an apparatus for making tubes, a cylinder head having a tubing core and a die, in combination with a pneumatic conveyer to carry the tube emerging from said core and die.

7. In an apparatus for making tubes, a cylinder having a tubing core and die concentric therewith, in combination with an endless conveyer and a mandrel in co-working relations to carry the tube emerging from said core and die, the said conveyer having a straight carrying portion lengthwise of said mandrel and pulleys over which said conveyer is stretched.

8. In an apparatus for making tubes, a cylinder head having a tubing core and a die, in combination with a mandrel extending co-axial with said core and die to receive the tube and an inflatable conveyer adjacent said mandrel to engage the tube.

9. In an apparatus for making tubes, a cylinder head having a tubing core and a die concentric therewith, in combination with a relatively long mandrel removably mounted as a co-extension of the said core, and a flexible conveyer partly circular in cross section and partly surrounding said mandrel and having a straight portion next beneath the mandrel to convey the tube emerging from said core and die.

10. In an apparatus for making tubes, a cylinder head having a tubing core and a die, in combination with a mandrel extending forwardly from said core and die, and an endless inflatable conveyer having a straight stretch extending parallel with said mandrel and partly encircling the same to engage the bottom and sides of the tube emerging from the said core and die.

11. In an apparatus for making tubes, a cylinder head having a tubing core and a die, in combination with a mandrel in axial co-extension with said core and die and an endless inflatable rubber tube mounted for travel beneath and adjacent said mandrel.

In testimony whereof I affix my signature.

ALBERT BLEECKER.